(12) United States Patent  
Seibert

(10) Patent No.: US 7,052,604 B2  
(45) Date of Patent: May 30, 2006

(54) WATER TREATMENT SYSTEM

(75) Inventor: Roy E. Seibert, McKinney, TX (US)

(73) Assignee: Procam Controls, Inc., Plano, TX (US)

( * ) Notice: Subject to any disclaimer, the term of this patent is extended or adjusted under 35 U.S.C. 154(b) by 260 days.

(21) Appl. No.: 10/681,985

(22) Filed: Oct. 9, 2003

(65) Prior Publication Data

US 2005/0077223 A1    Apr. 14, 2005

(51) Int. Cl.
*C02F 1/00* (2006.01)

(52) U.S. Cl. .................... 210/206; 210/209; 210/256; 210/437

(58) Field of Classification Search ............ 210/198.1, 210/199, 206, 209, 252, 256, 437
See application file for complete search history.

(56) References Cited

U.S. PATENT DOCUMENTS

| | | | | |
|---|---|---|---|---|
| 4,540,489 A | * | 9/1985 | Barnard | 210/287 |
| 4,780,197 A | * | 10/1988 | Schuman | 210/136 |
| 5,169,528 A | * | 12/1992 | Karbachsch et al. | 210/264 |
| 5,728,293 A | * | 3/1998 | Guoli et al. | 210/151 |
| 6,080,313 A | * | 6/2000 | Kelada | 210/631 |
| 6,117,332 A | * | 9/2000 | Hatch et al. | 210/697 |
| 6,712,977 B1 | * | 3/2004 | Okaue | 210/688 |
| 6,872,303 B1 | * | 3/2005 | Knapp et al. | 210/206 |

* cited by examiner

*Primary Examiner*—Betsey Morrison Hoey
(74) *Attorney, Agent, or Firm*—Michael A. O'Neil

(57) ABSTRACT

A water treatment system includes a cylindrical water filter having a cylindrical exit passageway. A plurality of spheres are formed from a predetermined water treatment chemical agent. The spheres are positioned at spaced apart locations along substantially the entire length of the exit passageway of the cylindrical water filter.

31 Claims, 4 Drawing Sheets

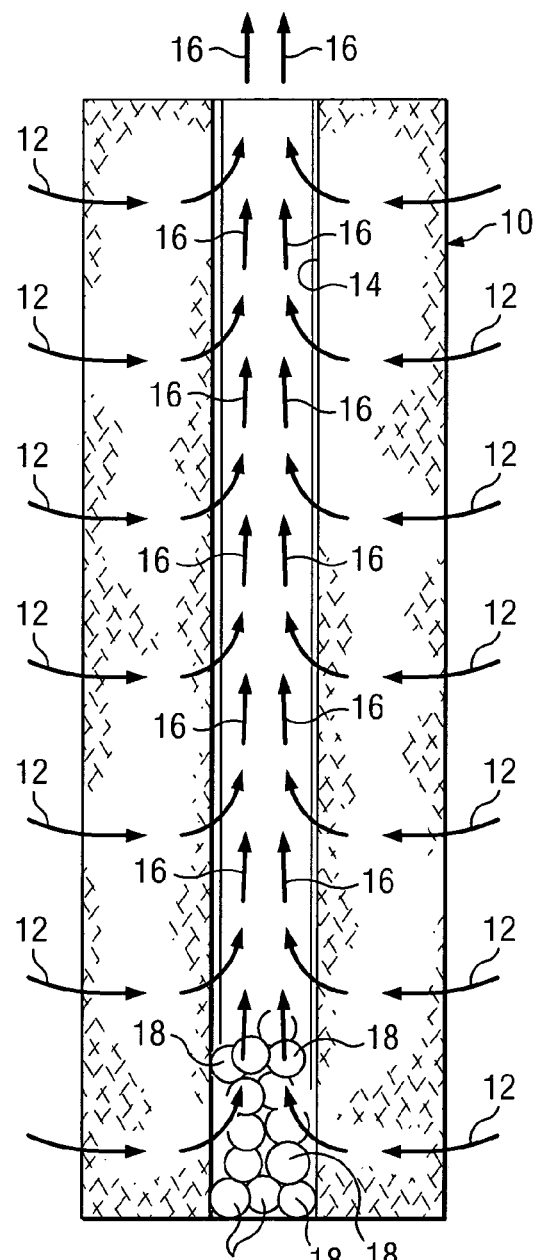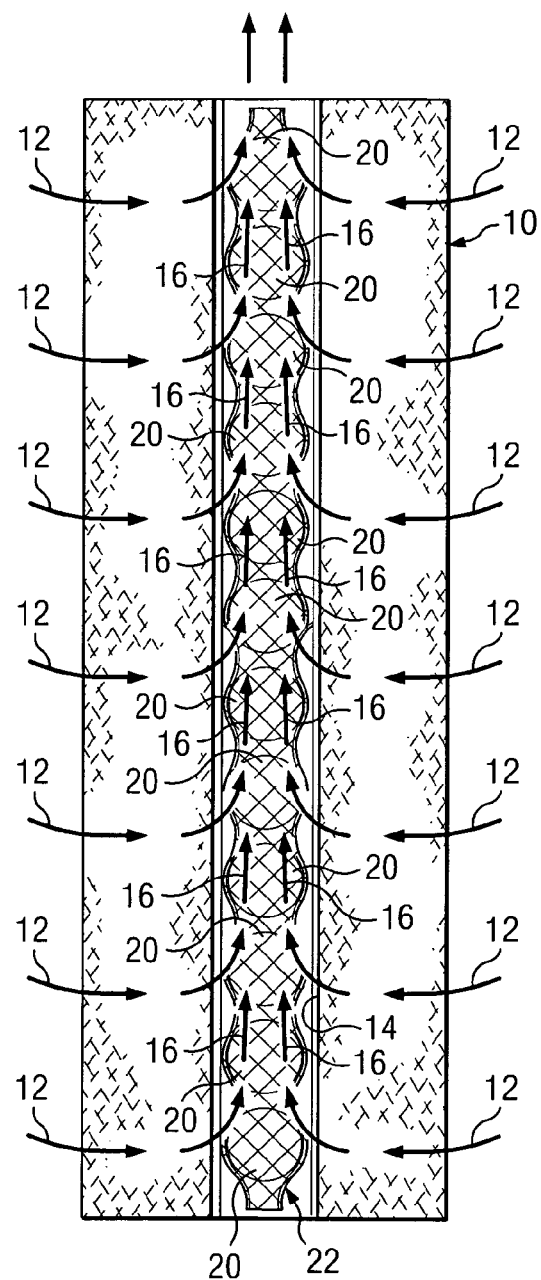
FIG. 1
(PRIOR ART)
FIG. 2

WATER TREATMENT SYSTEM

TECHNICAL FIELD

This invention relates generally to the introduction of chemical agents into a flowing water stream, and more particularly to a system for consistently introducing water treatment chemical agents into a flowing water system over an extended period of time.

BACKGROUND AND SUMMARY OF THE INVENTION

Referring to FIG. 1, there is shown a cylindrical filter 10 of the type commonly used in water treatment systems. The cylindrical water filter 10 may be comprised of a fibrous media for sediment reduction. Alternatively, the filter 10 may be formed from various carbon-based materials to effect reduction of chlorine, taste, odor, and/or organic materials. Water to be treated flows radially through the filter 10 as indicated by the arrows 12. After passing through the filter 10, the water enters an axially extending exit passageway 14 and flows outwardly therethrough as indicated by the arrows 16.

It has heretofore been known to utilize scale and corrosion reducing chemical agents in conjunction with radial filters of the type shown in FIG. 1. Heretofore the scale and corrosion inhibiting chemical agents have been formed into spheres 18 which are loosely received in the exit passageway 14 comprising the radial filter 10. This practice is disadvantageous for at least three reasons. First, the spheres comprising the scale and corrosion inhibiting chemical agent collect in the bottom of the cylindrical filter 10 and are therefore not contacted by water flowing through the upper portions of the filter. Second, allowing the spheres comprising the scale and corrosion resisting chemical agent to contact one another significantly reduces the portion of the periphery of each sphere which is actually in contact with the flowing water thereby substantially reducing the effectiveness of the system. Third, and perhaps most importantly, when the spheres comprising the scale and corrosion inhibiting chemical agent are allowed to contact one another as illustrated in FIG. 1, they tend to amalgamate into one large clump which substantially reduces the effective surface area of the scale and corrosion inhibiting chemical agent which in turn substantially reduces the rate at which the chemical agent is introduced into the flowing water.

The present invention comprises a system for introducing water treatment chemical agents into flowing water which overcomes the foregoing and other problems which have long since characterized the prior art. In accordance with the broader aspects of the invention, a chemical agent useful in the treatment of flowing water is formed into spheres. The spheres are positioned and maintained at spaced apart locations along the length of the exit passageway of a cylindrical filter.

Utilization of the present invention results in numerous advantages over the prior art. First, spheres comprising the selected water treatment chemical agent are positioned for contact by water flowing through the entirety of the cylindrical filter. Second, by maintaining the spheres in a spaced apart relationship, the surface area of each sphere that is contacted by the water flowing through the cylindrical filter is maximized. Third, by maintaining separation between adjacent spheres the possibility of the spheres combining with one another to form a large clump is eliminated.

In accordance a first embodiment of the invention, a cylindrical mesh tube receives and positions the spheres comprising the water treatment chemical agent. The cylindrical mesh tube comprises a polymeric mesh material that expands and contracts based on the size of the spheres trapped inside. In this manner the cylindrical mesh tube functions to grip and retain the spheres during the entire usable life of the filter cartridge. As the spheres dissolve and reduce in size, the cylindrical mesh tube contracts thereby retaining the spheres in a spaced apart relationship which maximizes the surface area of the spheres and prevents the spheres from fusing together.

In accordance with the second embodiment of the invention the spheres comprising the water treatment chemical agent are trapped between the coils of a right circular cylindrical spring. The spring having the spheres trapped therein extends axially through the exit passageway of a cylindrical water filter. The spring functions to grip and retain the spheres during the entire usable life of the cylindrical water filter.

In accordance with a third embodiment of the invention spheres comprising the water treatment chemical agent are formed with a passageway extending therethrough. A rod is extended through the passageways formed in the spheres and functions to support the spheres at spaced apart intervals along the exit passageway of a cylindrical water filter. Spacers may be positioned on the rod between the spheres to maintain separation therebetween. In accordance with a fourth embodiment of the invention a rod is provided with radially extending protrusions which are located at spaced intervals along the length of the rod. The spheres comprising the water treatment chemical agent are molded around the protrusions of the rod and are thereby retained in a spaced apart relationship with respect to one another.

In the practice of each of the three embodiments of the invention, the spaced apart spheres comprising the water treatment chemical agent may be positioned in the exit passageway of the cylindrical water filter. Alternatively, the spaced apart spheres comprising the water treatment chemical agent can be located for engagement by the flowing water as it enters the cylindrical water filter.

BRIEF DESCRIPTION OF THE DRAWINGS

A more complete understanding of the invention may be had by reference to the following Detailed Description when taken in conjunction with the accompanying Drawings, wherein:

FIG. 1 is a sectional view diagrammatically illustrating existing water treatment technology;

FIG. 2 is a sectional view illustrating a first embodiment of the water treatment system of the present invention;

DETAILED DESCRIPTION

Figure 3:
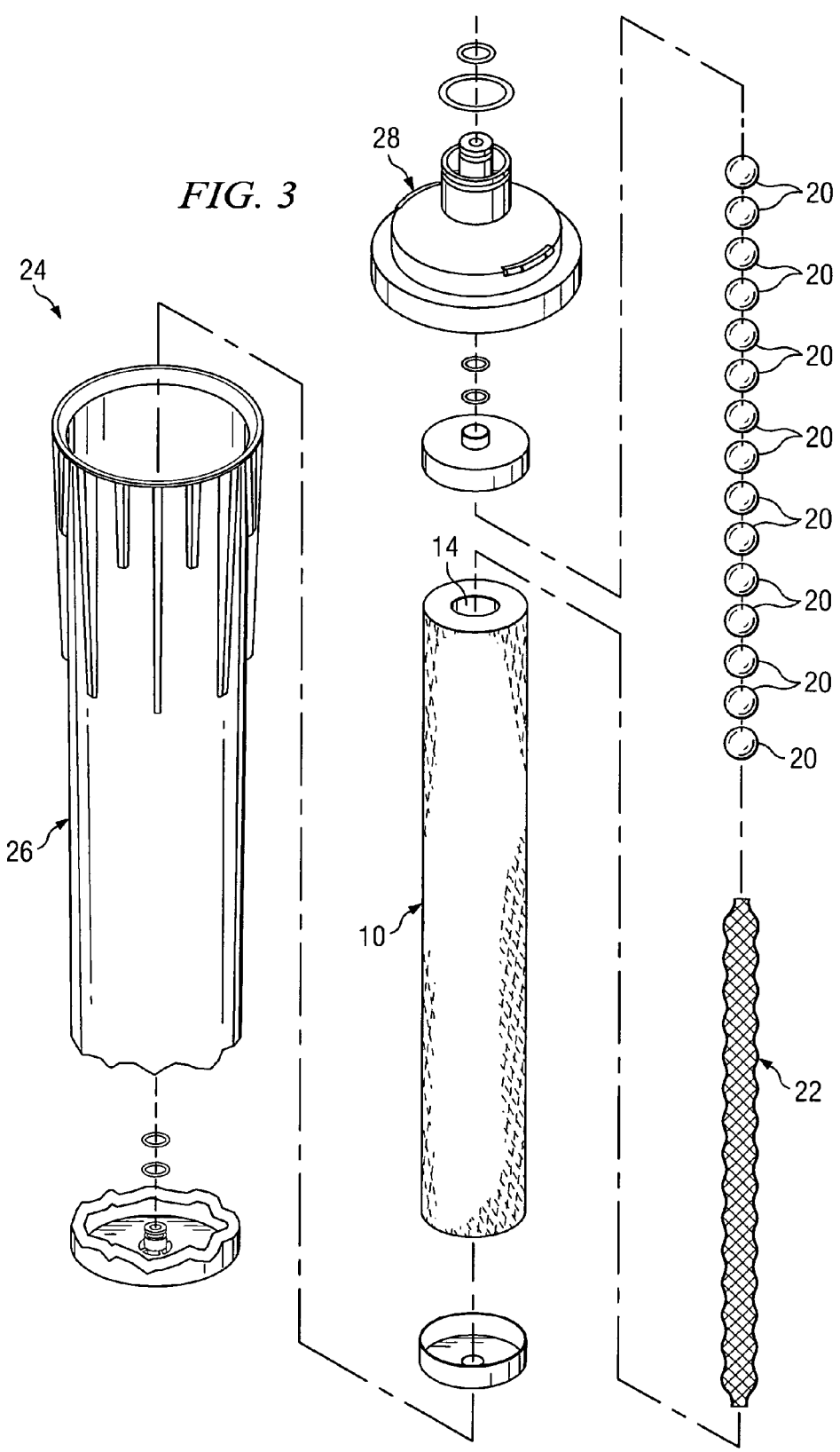
FIG. 3 is an exploded view illustrating a water treatment system comprising a first example of the first embodiment of the invention.

Referring now to the Drawings, and particularly to FIG. 2 thereof, there is shown a cylindrical filter 10 of the type commonly used in water treatment systems. The cylindrical water filter 10 may be comprised of a fibrous media for sediment reduction. Alternatively, the filter 10 may be formed from various carbon-based materials to effect reduction of chlorine, taste, odor, and/or organic materials. Water to be treated flows radially through the filter 10 as indicated by the arrows 12. After passing through the filter 10, the water enters an axially extending exit passageway 14 and flows outwardly therethrough as indicated by the arrows 16.

In accordance with a first embodiment of the present invention a predetermined water treatment chemical agent is formed into a plurality of spheres 20. The diameter of the spheres 20 depends upon the size of the exit passageway 14 of the cylindrical water filter 10, the rate of flow of water passing through the cylindrical water filter 10 and other factors well known to those skilled in the art.

The spheres 20 are received in a cylindrical mesh tube 22. The tube 22 is formed from a polymeric material of the type exhibiting memory. That is, the tube 22 initially has a relatively small diameter and expands to receive the spheres 20. Then, as the material comprising the spheres is utilized in water treatment and the spheres 20 are therefore reduced in size, the polymeric material comprising the cylindrical mesh tube 22 contracts back into its original configuration. In this manner the spheres 20 comprising the water treatment chemical agent are maintained in a spaced apart relationship throughout the entire life of the cylindrical water filter 10.

Utilization of the present invention results in numerous advantages over the prior art. First, spheres comprising the selected water treatment chemical agent are positioned for contact by water flowing through the entirety of the cylindrical filter. Second, by maintaining the spheres in a spaced apart relationship, the surface area of each sphere that is contacted by the water flowing through the cylindrical filter is maximized. Third, by maintaining separation between adjacent spheres the possibility of the spheres combining with one another to form a large clump is eliminated.

Referring to FIG. 3 there is shown a water treatment system 24 incorporating the present invention. The system 24 includes a housing 26 which receives a cylindrical water treatment filter 10 of the type having an axially extending exit passageway 14 extending therethrough. A plurality of spheres 20 are formed from a predetermined water treatment chemical agent. The spheres 20 are received in a cylindrical mesh tube 22 formed from a polymeric material. The cylindrical mesh tube functions to receive the spheres 20 and to maintain the spheres 20 in a spaced apart relationship with respect to one another.

The cylindrical mesh tube 22 having the spheres 20 positioned therein at spaced apart intervals is positioned within the exit passageway 14 of the cylindrical filter 10. The cylindrical filter 10 is then installed in the housing 26 in the usual manner. Thereafter an end cap 28 is positioned in engagement with the housing 26 to retain the cylindrical filter 10 therein and to control the flow of water therethrough.

Figure 4:
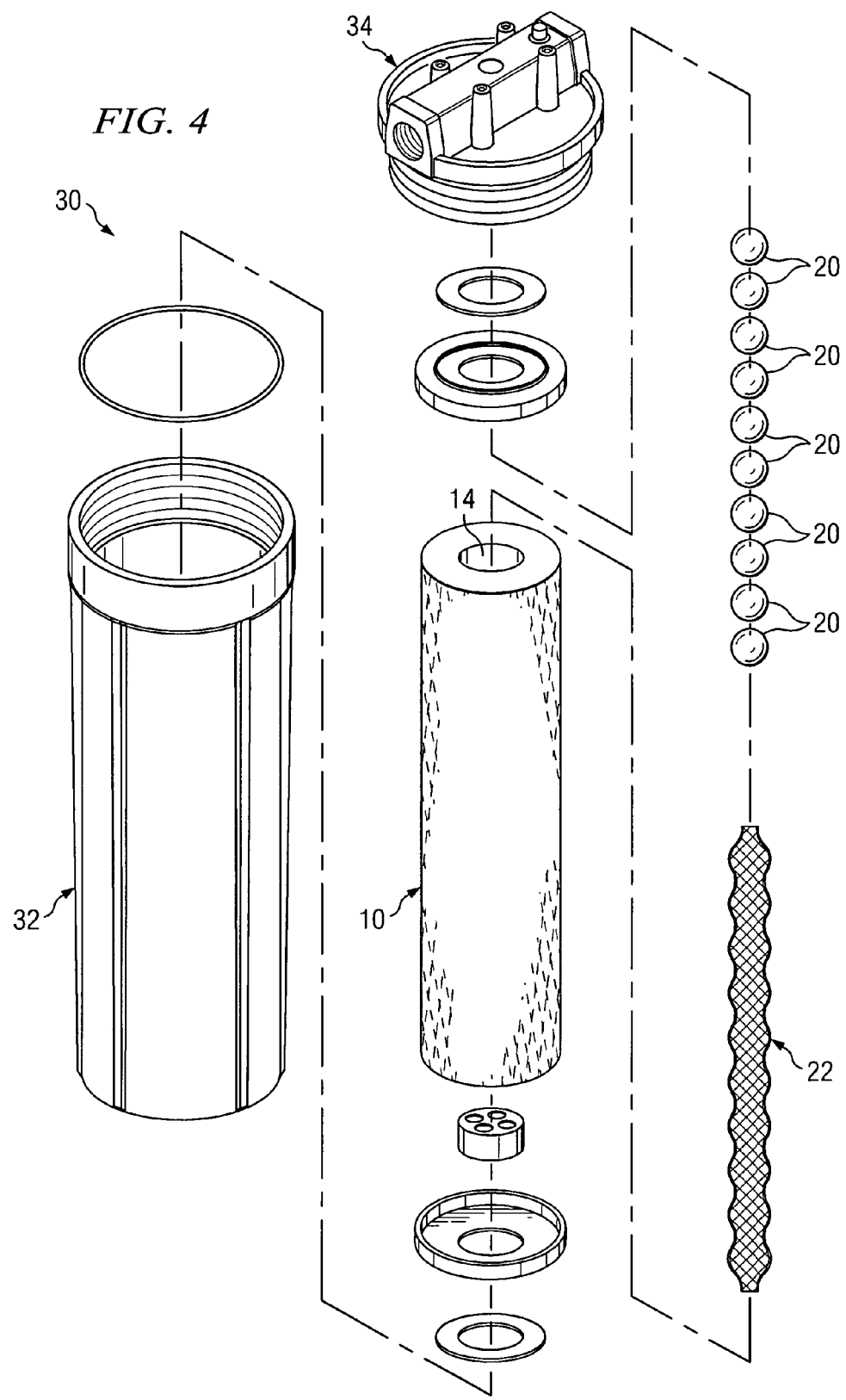
FIG. 4 is an exploded view illustrating a water treatment system comprising a second example of the first embodiment of the invention.

Referring to FIG. 4 there is shown a water treatment system 30 incorporating the present invention. The system 30 includes a housing 32 which receives a cylindrical water treatment filter 10 of the type having an axially extending exit passageway 14 extending therethrough. A plurality of spheres 20 are formed from a predetermined water treatment chemical agent. The spheres 20 are received in a cylindrical mesh tube 22 formed from a polymeric material. The cylindrical mesh tube functions to receive the spheres 20 and to maintain the spheres 20 in a spaced apart relationship with respect to one another.

The cylindrical mesh tube 22 having the spheres 20 positioned therein at spaced apart intervals may be positioned within the exit passageway 14 of the cylindrical filter 10. The cylindrical filter 10 is then installed in the housing 32 in the usual manner. Thereafter an end cap 34 is positioned in engagement with the housing 32 to retain the cylindrical filter 10 therein and to control the flow of water therethrough. Alternatively, the mesh tube 22 having the spheres 20 therein may be positioned inside the housing 32 but on the exterior of the filter 10, that is, in the path of water flowing into the filter.

Figure 5:
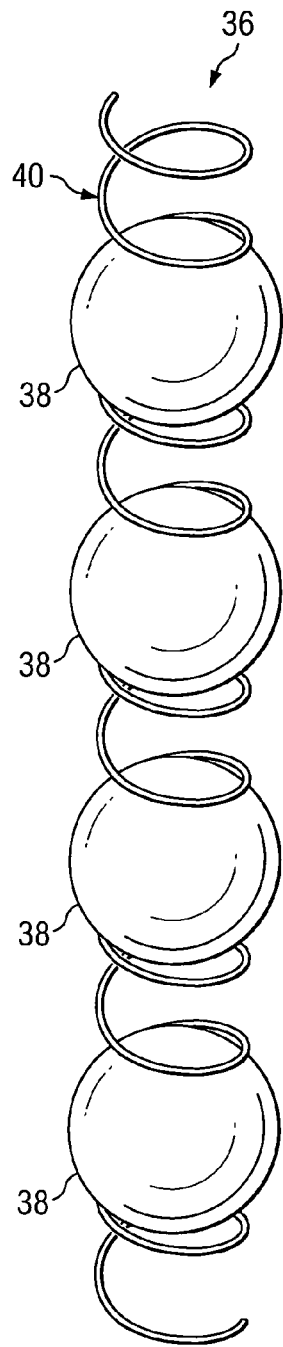
FIG. 5 is an illustration of a water treatment system comprising a second embodiment of the invention.

Referring to FIG. 5, there is shown a water treatment system 36 comprising a second embodiment of the invention. In accordance therewith a predetermined water treatment chemical agent is formed into a plurality of spheres 38. The diameters of the spheres 38 depends upon the size of the exit passageway of the cylindrical filter in which the water treatment system 36 is used, the rate of flow of water passing through the cylindrical filter in which the water treatment system 36 is used, and other factors well known to those skilled in the art.

The second embodiment of the invention further comprises a right circular cylindrical spring 40. The spring 40 is preferably formed from a polymeric material of the type having memory. This allows the coils comprising the spring 40 to be separated sufficiently to receive the spheres 38 therein. The spring 40 having the spheres 38 received and positioned therein is then positioned in the exit tube of a circular water filter and functions to position the spheres 38 at spaced apart locations along substantially the entire length thereof. Then, as the material comprising the spheres 38 is consumed during the operation of the cylindrical water filter, the coils comprising the spring 40 return to their original configuration. In this manner the spring 40 functions to maintain the spheres 38 in a spaced apart relationship throughout the life of the cylindrical water filter.

Figure 6:
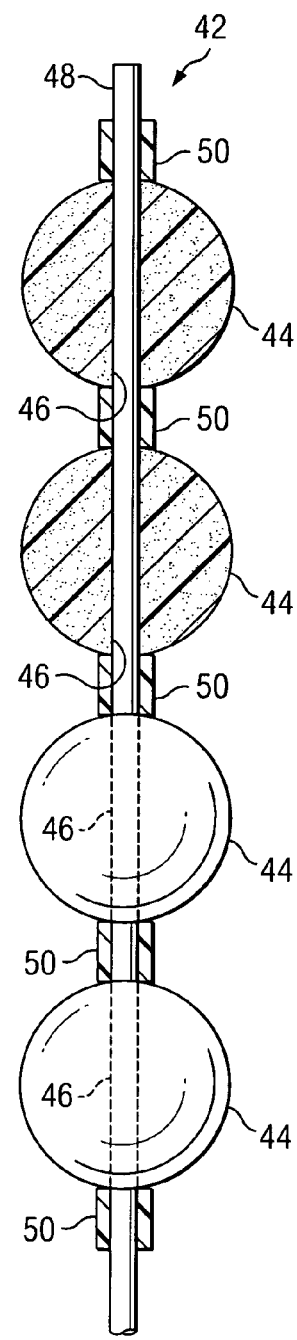
FIG. 6 is a sectional view illustrating a third embodiment of the water treatment system of the present invention.

A water treatment system 42 comprising a third embodiment of the invention is illustrated in FIG. 6. In accordance therewith a predetermined water treatment chemical agent is formed into a plurality of spheres 44. The diameter of the spheres 44 depends upon the size of the exit passageway of the cylindrical filter in which the water treatment system 42 is used, the rate of flow of water through the water filter in which the water treatment system 42 is used, and other factors well known to those skilled in the art.

Each of the spheres 44 has a cylindrical passageway 46 extending diametrically therethrough. A rod 48 extends through the passageways 46 of the spheres 44 and functions to maintain the spheres 44 in a spaced apart relationship along the length thereof.

In some instances the outside diameter of the rod 48 may exceed the inside diameters of the passageways 46 extending through the spheres 44 by a predetermined amount such that the spheres 44 are securely engaged with the rod 48 to the extent that slippage therebetween does not occur. In other instances it may be found desirable to position spacers 50 on the rod 48 in order to maintain separation between the spheres mounted thereon.

In the utilization of the water treatment system 42 the rod 48 having the spheres 44 mounted thereon is positioned in the exit passageway of a cylindrical water filter. The rod 48 functions to position the spheres 44 at spaced apart intervals along the entire length of the exit passageway of the cylindrical filter. The spheres 44 are maintained in a spaced apart relationship throughout the entire life of the cylindrical water filter having the water treatment system 42 installed therein.

Figure 7:
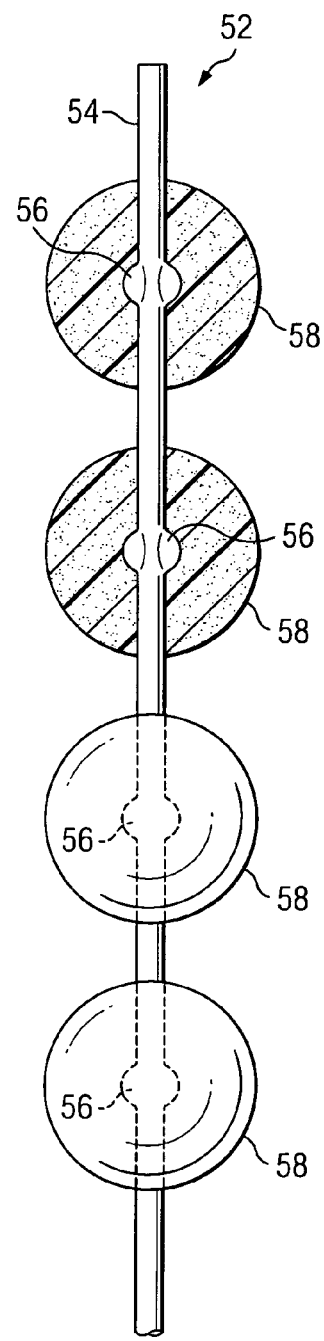
FIG. 7 is a sectional view illustrating a fourth embodiment of the water treatment system of the present invention.

Referring to FIG. 7, there is shown a water treatment system 52 comprising a fourth embodiment of the invention. The water treatment system 52 includes a rod 54 having a plurality of radially extending protrusions 56 formed thereon. A plurality of spheres 58 each formed from a predetermined water treatment chemical agent are molded around the protrusions 56 of the rod 54. The diameters of the spheres 58 depends on the dimensions of the cylindrical water filter in which the system 52 is used, the flow rate of water passing through the water filter, and other factors well known to those skilled in the art.

The rod 54 is utilized to position the spheres 58 at spaced apart intervals along the entire length of the exit passageway of a cylindrical water filter. The engagement of the spheres 58 with the protrusions 56 assures separation between the spheres 58 throughout the entire life of the cylindrical water filter.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. In a water treatment system of the type including a cylindrical water filter having a cylindrical exit passageway defined by an axis and having a predetermined inside diameter and a predetermined length, the improvement comprising:
    a plurality of spheres each formed from a predetermined water treatment chemical agent and each having an outside diameter smaller than the inside diameter of the exit passageway of the cylindrical water filter; and
    means for positioning the spheres at spaced apart locations along substantially the entire length of the exit passageway of the cylindrical water filter.

2. The water treatment system according to claim 1 wherein the sphere positioning means comprises a mesh tube formed from a polymeric material and extending along the axis of the exit passageway of the cylindrical water filter for receiving and positioning the spheres therein.

3. The water treatment system according to claim 2 wherein the mesh tube is formed from a polymeric material having memory whereby the mesh tube is expanded to initially receive the spheres therein and contracts as the diameters of the spheres are reduced as the water treatment chemical agent comprising the spheres is dissolved into the water flowing through the cylindrical filter.

4. The water treatment system according to claim 1 wherein the sphere positioning means comprises a coil spring formed from a polymeric material and extending along the axis of the exit passageway of the cylindrical water filter and wherein the spheres are received between adjacent coils comprising the spring.

5. The water treatment system according to claim 4 wherein the coil spring is formed from a polymeric material having memory whereby the distance between adjacent coils of the spring expands to receive the spheres therebetween and contracts as the water treatment chemical agent comprising the spheres is dissolved into the water flowing through the cylindrical water filter.

6. The water treatment system according to claim 1 wherein each of the spheres has a passageway extending diametrically therethrough and wherein the sphere positioning means comprises a rod formed from a polymeric material and having the spheres supported at spaced apart intervals thereon.

7. The water treatment system according to claim 6 wherein the passageways through the spheres are characterized by a predetermined inside diameter and wherein the rod is characterized by a predetermined outside diameter which is sufficiently larger than the inside diameter of the spheres to prevent the spheres from moving relative to the rod.

8. The water treatment system according to claim 6 further including a plurality of spacers mounted on the rod and positioned between adjacent spheres mounted thereon.

9. The water treatment system according to claim 6 wherein the rod has a plurality of radially extending protrusions formed thereon, wherein the radially extending protrusions are located at spaced apart intervals along the length of the rod, and wherein the spheres are engaged with the protrusions to prevent relative movement between the spheres and rod.

10. The water treatment system according to claim 9 wherein the spheres are molded around the radially extending protrusions of the rod.

11. A water treatment system comprising:
    a cylindrical filter having an axis and having a cylindrical exit passageway extending along the axis;
    the cylindrical exit passageway of the cylindrical water filter being characterized by a predetermined inside diameter and a predetermined length;
    a plurality of spheres each formed from a predetermined water treatment chemical agent and each having an outside diameter which is less than the inside diameter of the exit passageway of the cylindrical water filter; and
    means for securing the spheres at spaced apart locations along substantially the entire length of the exit passageway of the cylindrical water filter.

12. The water treatment system according to claim 11 wherein the sphere positioning means comprises a mesh tube formed from a polymeric material and extending along the axis of the exit passageway of the cylindrical water filter for receiving and positioning the spheres therein.

13. The water treatment system according to claim 12 wherein the mesh tube is formed from a polymeric material having memory whereby the mesh tube is expanded to initially receive the spheres therein and contracts as the diameters of the spheres are reduced as the water treatment chemical agent comprising the spheres is dissolved into the water flowing through the cylindrical filter.

14. The water treatment system according to claim 11 wherein the sphere positioning means comprises a coil spring formed from a polymeric material and extending along the axis of the exit passageway of the cylindrical water filter and wherein the spheres are received between adjacent coils comprising the spring.

15. The water treatment system according to claim 14 wherein the coil spring is formed from a polymeric material having memory whereby the distance between adjacent coils of the spring expands to receive the spheres therebetween and contracts as the water treatment chemical agent comprising the spheres is dissolved into the water flowing through the cylindrical water filter.

16. The water treatment system according to claim 11 wherein each of the spheres has a passageway extending diametrically therethrough and wherein the sphere positioning means comprises a rod formed from a polymeric material and having the spheres supported at spaced apart intervals thereon.

17. The water treatment system according to claim 16 wherein the passageways through the spheres are characterized by a predetermined inside diameter and wherein the rod is characterized by a predetermined outside diameter which is sufficiently larger than the inside diameter of the spheres to prevent the spheres from moving relative to the rod.

18. The water treatment system according to claim 16 further including a plurality of spacers mounted on the rod and positioned between adjacent spheres mounted thereon.

19. The water treatment system according to claim 16 wherein the rod has a plurality of radially extending protrusions formed thereon, wherein the radially extending protrusions are located at spaced apart intervals along the length of the rod, and wherein the spheres are engaged with the protrusions to prevent relative movement between the spheres and rod.

20. The water treatment system according to claim 19 wherein the spheres are molded around the radially extending protrusions of the rod.

21. A water treatment system comprising:
a cylindrical filter having an axis and having a cylindrical exit passageway extending along the axis;
the cylindrical exit passageway of the cylindrical water filter being characterized by a predetermined inside diameter and a predetermined length;
a plurality of spheres each formed from a predetermined water treatment chemical agent and each having an outside diameter which is less than the inside diameter of the exit passageway of the cylindrical water filter; and
a mesh tube formed from a polymeric material positioned within the exit passageway of the cylindrical filter and extending along the axis thereof for receiving the spheres and for retaining the spheres at predetermined spaced apart locations along substantially the entire length of the exit passageway of the cylindrical water filter.

22. The water treatment system according to claim 21 wherein the cylindrical mesh tube is formed from a polymeric material having memory which expands to initially receive the spheres and which contracts as the water treatment chemical agent comprising the spheres dissolves into the water flowing through the cylindrical filter.

23. In a water treatment system of the type including a cylindrical water filter having an axis and a predetermined length, the improvement comprising:
a plurality of spheres each formed from a predetermined water treatment chemical agent; and
means for positioning the spheres at spaced apart locations along substantially the entire length of the cylindrical water filter and in the path of water flowing therethrough;
the sphere positioning means comprising a mesh tube formed from a polymeric material for receiving and positioning the spheres therein.

24. The water treatment system according to claim 23 wherein the mesh tube is formed from a polymeric material having memory whereby the mesh tube is expanded to initially receive the spheres therein and contracts as the diameters of the spheres are reduced as the water treatment chemical agent comprising the spheres is dissolved into the water flowing through the cylindrical filter.

25. In a water treatment system in the type including a cylindrical water filter having an axis and a predetermined length the improvement comprising:
a plurality of spheres each formed from a predetermined water treatment chemical agent; and
means for positioning the spheres at spaced apart locations along substantially the entire length of the cylindrical water filter and in the path of water flowing therethrough;
the sphere positioning means comprises a coil spring formed from a polymeric material and wherein the spheres are received between adjacent coils comprising the spring.

26. The water treatment system according to claim 25 wherein the coil spring is formed from a polymeric material having memory whereby the distance between adjacent coils of the spring expands to receive the spheres therebetween and contracts as the water treatment chemical agent comprising the spheres is dissolved into the water flowing through the cylindrical water filter.

27. In a water treatment system of the type including a cylindrical water filler having an axis and a predetermined length, the improvement comprising:
a plurality of spheres each formed from a predetermined water treatment chemical agent; and
means for positioning the spheres at spaced apart locations along substantially the entire length of the cylindrical water filter and in the path of water flowing therethrough;
each of the spheres having a passageway extending diametrically therethrough; and
wherein the sphere positioning means comprises a rod formed from a polymeric material and having the spheres supported at spaced apart intervals thereon.

28. The water treatment system according to claim 27 wherein the passageways through the spheres are characterized by a predetermined inside diameter and wherein the rod is characterized by a predetermined outside diameter which is sufficiently larger than the inside diameter of the spheres to prevent the spheres from moving relative to the rod.

29. The water treatment system according to claim 27 further including a plurality of spacers mounted on the rod and positioned between adjacent spheres mounted thereon.

30. The water treatment system according to claim 27 wherein the rod has a plurality of radially extending protrusions formed thereon, wherein the radially extending protrusions are located at spaced apart intervals along the length of the rod, and wherein the spheres are engaged with the protrusions to prevent relative movement between the spheres and rod.

31. The water treatment system according to claim 30 wherein the spheres are molded around the radially extending protrusions of the rod.

* * * * *

UNITED STATES PATENT AND TRADEMARK OFFICE
CERTIFICATE OF CORRECTION

PATENT NO. : 7,052,604 B2
APPLICATION NO. : 10/681985
DATED : May 30, 2006
INVENTOR(S) : Roy E. Seibert It is certified that error appears in the above-identified patent and that said Letters Patent is hereby corrected as shown below:

On Title Page Item (56) col.2

IN REFERENCE CITED

Please add the following references as our records show our Information Disclosure Statement which contains theses was received by the U.S. Patent Office on 11-3-03.

| Document No. | Date | Name | Class | Subclass |
|---|---|---|---|---|
| 5,580,448 | 12/3/96 | Brandreth, III | 210 | 206 |
| 6,241,884 | 6/5/01 | Hansen | 210 | 198.1 |
| 6,270,664 | 8/7/01 | Tsabari | 210 | 206 |
| 6,485,641 | 11/26/02 | McLeod | 210 | 198.1 |
| 6,589,461 | 7/8/03 | Hansen, incapacitated et al. | 264 | 109 |

Col. 8, claim 25, line 8, replace "length the improvement" with --length, the improvement --.

Col. 8, claim 27, replace "water filler" with -- water filter --.

Signed and Sealed this

Nineteenth Day of September, 2006

JON W. DUDAS
*Director of the United States Patent and Trademark Office*